United States Patent [19]
Hokanson et al.

[11] Patent Number: 5,967,286
[45] Date of Patent: Oct. 19, 1999

[54] ADJUSTABLE DRIVEN CLUTCH

[75] Inventors: Joseph Hokanson; Allen Roberts, both of Idaho Falls; Robert Warbrick, Hayden, all of Id.

[73] Assignee: Starting Line Products, Inc., Idaho Falls, Id.

[21] Appl. No.: 08/904,247

[22] Filed: Jul. 31, 1997

[51] Int. Cl.[6] .................................................. F16H 55/52
[52] U.S. Cl. ................................. 192/110 R; 192/111 R; 192/54.52; 192/93 A
[58] Field of Search ........................... 192/110 R, 111 R, 192/111 B, 54.52, 93 A; 474/14, 19, 13, 46

[56] References Cited

U.S. PATENT DOCUMENTS

| | | | |
|---|---|---|---|
| 1,789,056 | 1/1931 | Valletta | 192/111 B |
| 3,673,884 | 7/1972 | Southiere | 74/242.11 |
| 3,698,497 | 10/1972 | Bombardier | 180/5 R |
| 3,768,337 | 10/1973 | Racicot | 74/752 |
| 3,777,583 | 12/1973 | Talbot | 74/230.17 |
| 3,861,228 | 1/1975 | Adams | 474/19 |
| 3,884,097 | 5/1975 | Avramidis et al. | 74/740 |
| 3,893,350 | 7/1975 | Gingras | 74/688 |
| 3,961,539 | 6/1976 | Tremblay et al. | 74/230.17 |
| 3,967,509 | 7/1976 | Teal | 474/19 |
| 4,023,635 | 5/1977 | Teal | 180/5 R |
| 4,069,882 | 1/1978 | Leonard et al. | 180/5 R |
| 4,310,322 | 1/1982 | Beck | 474/19 |
| 4,575,363 | 3/1986 | Burgess et al. | 474/14 |
| 4,585,429 | 4/1986 | Marier | 474/12 |
| 4,697,665 | 10/1987 | Eastman et al. | 180/230 |
| 5,038,881 | 8/1991 | Wysocki et al. | 180/184 |
| 5,172,786 | 12/1992 | Ishibashi et al. | 180/190 |
| 5,209,703 | 5/1993 | Mastine et al. | 474/14 |
| 5,279,381 | 1/1994 | Fukuda | 180/190 |
| 5,372,215 | 12/1994 | Fukuda | 180/190 |
| 5,421,784 | 6/1995 | Robert | 474/13 |
| 5,460,575 | 10/1995 | Berto | 474/13 X |
| 5,516,333 | 5/1996 | Benson | 474/19 |
| 5,533,585 | 7/1996 | Kawano et al. | 180/190 |
| 5,538,120 | 7/1996 | Berardicurti | 192/54.52 |
| 5,562,555 | 10/1996 | Peterson | 474/14 |
| 5,607,026 | 3/1997 | Roiux et al. | 180/190 |

*Primary Examiner*—Charles A. Marmor
*Assistant Examiner*—Saúl J. Rodriguez
*Attorney, Agent, or Firm*—Hamilton, Brook, Smith & Reynolds, P.C.

[57] ABSTRACT

An adjustment mechanism for use with a driven clutch of continuously variable transmission has an adjustor ring that receives a first end of a spring. A follower plate be carried by one of the pulley halves has a surface to interact with the other pulley half. The follower plate receives the adjustor ring. A holding element, a set screw in a preferred embodiment, retains the adjustor ring in a position relative to the follower plate. The mechanism allows rotation of the adjustor ring relative to the follower plate to adjust the spring force.

7 Claims, 11 Drawing Sheets

ADJUSTABLE DRIVEN CLUTCH

BACKGROUND OF THE INVENTION

Various relatively small motorized vehicles, such as snowmobiles and golf carts, use a V-belt type continuously variable transmission. Variable transmissions include a drive pulley or clutch and a driven pulley or clutch. Each pulley is composed of a fixed sheave or pulley half that is fixed in the axial direction, and a movable sheave or pulley half, which is movable in the axial direction. A V-belt joins the drive pulley and the driven pulley.

These variable transmissions are equipped with a speed or revolution per minute (RPM) responsive mechanism associated with the drive pulley and a torque responsive mechanism associated with the driven pulley. Therefore, the drive pulley and the driven pulley continuously vary the shift ratio in relation to the drive speed and the driven torque.

When the torque load upon the driven shaft is increased with the increase in the load upon the drive track, as when the vehicle runs uphill, the torque responsive mechanism transmits an axial force matching that increase from the driven pulley to the drive pulley so that a satisfactory shift ratio can always be attained.

The torque responsive mechanism can include inclined cam surfaces which are opposed to one another and positioned between a helix, sometimes referred to as a spring cap, which is fixed to the movable sheave-half or pulley-half, and a fixed sheave half or pulley half. Those opposed inclined cam surfaces move in the axial direction relative to each other by the torque loaded upon the driven shaft, while the pulley halves are sliding and turning relative to each other. The movable sheave is moved relative to the fixed sheave by the relative movement caused by the cooperating cam surfaces. The effective diameter of the driven pulley is increased by moving the two pulley halves closer together.

A spring interposed between the fixed sheave and the spring cap provides a preload conditional thereby creating a maximum diameter. The spring is both in compression and in torsion. In order to adjust the preload, the driven pulley needs to be taken apart and the connection points of the springs adjusted.

SUMMARY OF THE INVENTION

This invention relates generally to an adjustment mechanism where the user can adjust the preload on the driven pulley spring without dismantling the clutch assembly and without taking the clutch off the vehicle. This provides a system that substantially reduces the effort involved in adjusting the preload, significantly reduces the risk of losing parts during adjustment, and thus reduces other disruptions in the use of the vehicle.

A preferred embodiment of the invention relates to a driven clutch of a continuously variable transmission. The driven clutch has a fixed pulley half, a movable pulley half and a spring. The adjustment mechanism has an adjustor ring that receives an end of a spring. A follower plate that is carried by one of the pulley halves has a surface that interacts with the other pulley half. The follower plate receives the adjustor ring. A positioning and holding element such as a set screw in a preferred embodiment, retains the adjustor ring in a position relative to the follower plate. This mechanism allows rotation of the adjustor ring relative to the follower plate to adjust the spring force.

In a preferred embodiment, a snowmobile driven clutch has a driven shaft and a driven sheave having a fixed sheave half and a movable sheave half. The fixed sheave half is secured to the driven shaft. The driven clutch has a pair of complementary surfaces for moving in engagement relative to each other as the sheave halves rotate relative to each other. One of the complementary surfaces is carried by the fixed sheave half and has a plurality of cam tracks on a cylindrical ring. The other complementary surface is carried by a follower plate and has a plurality of roller devices. The follower plate is carried by the movable sheave half by a plurality of posts that extend through the fixed sheave half.

A coiled spring is interposed between the follower plate and the fixed sheave half. The spring has a first leg received by the fixed sheave half, and a second leg. An adjustor ring is carried by and that rotates relative to the follower plate. The adjustor ring has a cylindrical ring with an annular ring that is received in a groove of the follower plate. The adjustor mechanism retains the second leg of the spring. A set screw retains the adjustor ring in a set position relative to the follower plate by extending through an adjustor hole in the annular ring of the adjustor ring aligned with an adjustor hole in the follower plate, and allowing movement of the adjustor ring relative to the follower plate in a movement position.

In another preferred embodiment, a snowmobile driven clutch has a driven shaft and a driven sheave having a fixed sheave half and a movable sheave half. The fixed sheave half is secured to the driven shaft. The driven clutch has a pair of complementary surfaces for moving in engagement relative to each other as sheave halves rotate relative to each other. One of the complementary surfaces is a plurality of slides carried by the movable sheave half. The other complementary surface has a plurality of ramps carried by a follower plate. The follower plate is carried by the driven shaft and is fixed relative to the fixed sheave half.

A coiled spring is interposed between the follower plate and the movable sheave half. The spring has a first leg received by the movable sheave halves, and a second leg. The adjustor ring is an annular ring received by an annular bore of the follower plate and that rotates relative to the follower plate. The adjustor ring retains the second leg of the spring. The follower plate has an annular bore surrounded by the plurality of ramps. A set screw is received by one of a plurality of holes in the annular ring aligned with an adjustor hole in the follower plate to retain the adjustor ring in a set position relative to the follower plate and allowing movement of the adjustor ring relative to the follower plate in a second position.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
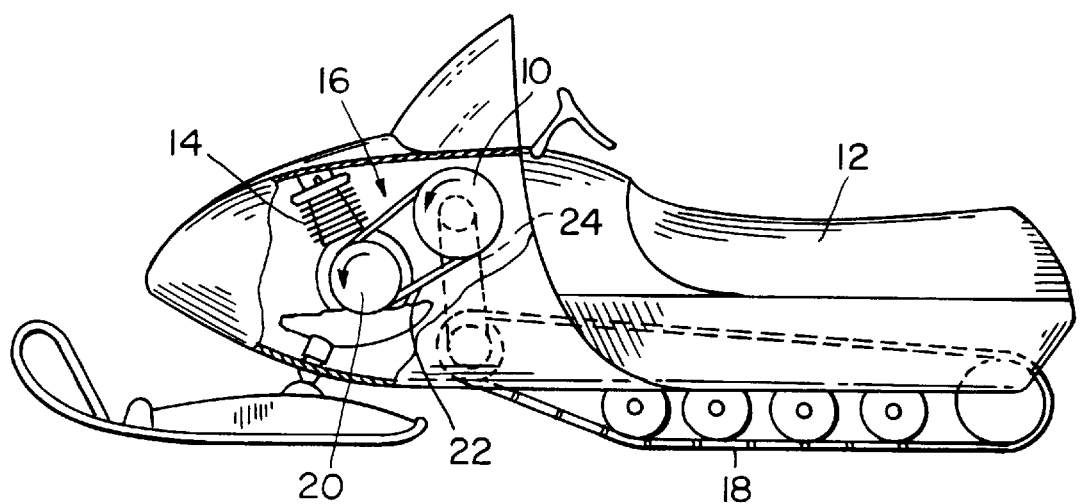
FIG. 1 is a side elevation showing a snowmobile having a driven clutch according to the present invention.

When referring to the drawings in the description which follows, like numerals indicate like elements. FIG. 1 shows a driven clutch 10 in a snowmobile 12 according to the invention.

Referring to FIG. 1, the snowmobile 12 is equipped with an engine 14, a V-belt type continuously variable transmission 16, and a drive track 18. The V-belt type continuously variable transmission 16 has a drive or primary clutch 20 connected to the output shaft of the engine 14, the driven or secondary clutch 10 and a V-belt 22, extending between the drive clutch 20 and the driven clutch 10. In the embodiment shown, the engine 14 drives the drive track 18 through the V-belt type continuously variable transmission 16 and a chain 24, shown in hidden line, which extends from the driven clutch 10 to a sprocket on the drive track 18.

The V-belt type continuously variable transmission 16 is described in more detail with reference to FIG. 2. The drive pulley 20, at the drive side of the continuously variable transmission 16, has a fixed pulley or sheave half 28 and a movable pulley or sheave half 30. The fixed pulley half 28 is fastened to a drive shaft 32 so that it cannot move in the axial direction. The movable pulley half 30 is movable in the axial direction relative to the drive shaft 32. A weight 34 is hinged to the movable pulley half 30 in proximity to a circumferential edge. A roller positioned by the drive shaft abuts the weight. The weight constitutes a speed responsive element and urges the movable pulley half 30 towards the fixed pulley half 28 under the influence of centrifugal force As the rotational speed of the drive shaft 32 increases, the curved face abutting against the roller pushes the movable pulley half 30 towards the fixed pulley half 28, therein increasing the effective diameter of the drive pulley 20. The drive pulley 20 as described above is well known in the art and it is recognized that other speed responsive drive pulley mechanisms can be used.

Figure 2:
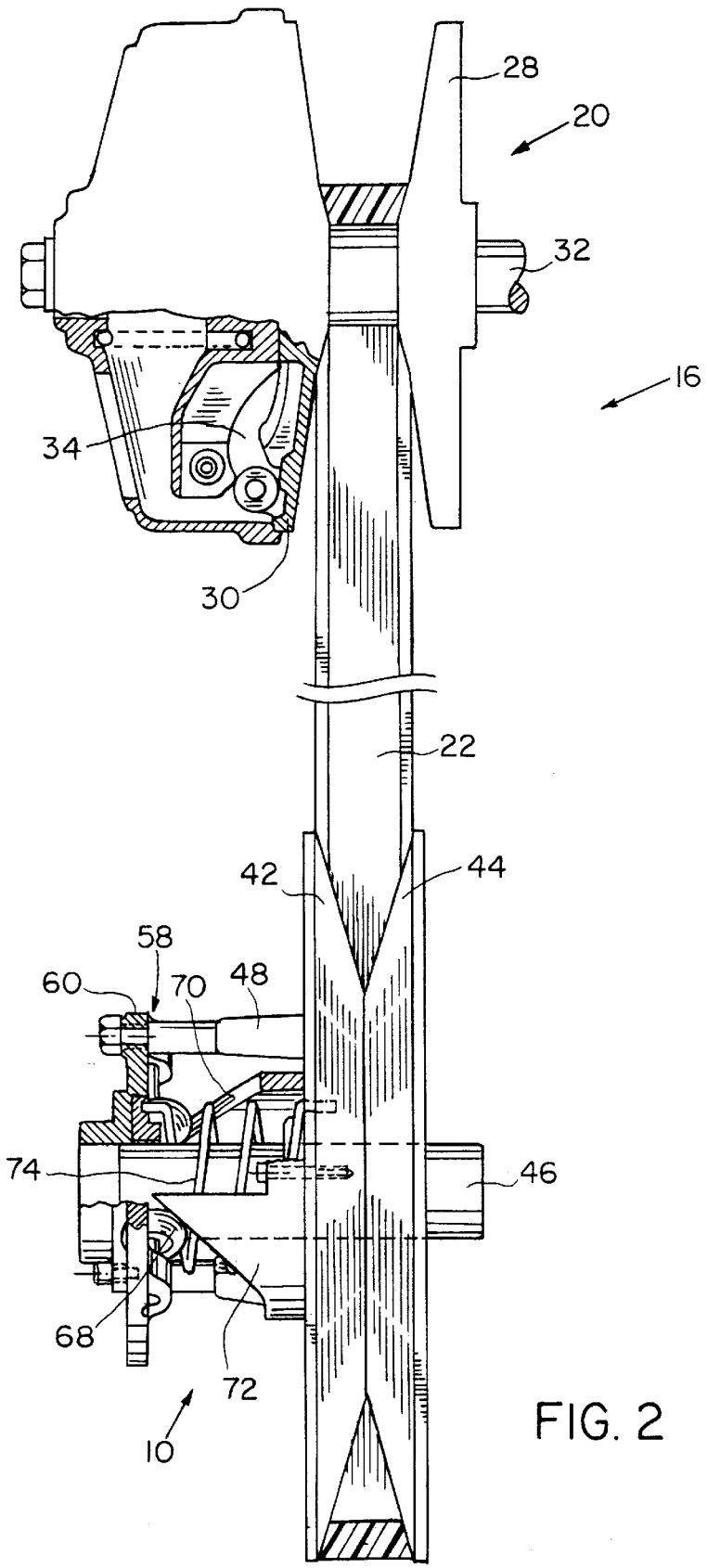
FIG. 2 is a sectional view of a V-belt continuously variable transmission having the drive clutch according to the present invention.

Still referring to FIG. 2, the driven pulley 10, according to this invention, has a fixed pulley or sheave half 42 and a movable pulley or sheave half 44. The fixed pulley half 42 is fastened to a driven shaft 46 and is not movable in the axial direction. The movable pulley half 44 has sleeve bearings between itself and the shaft 46 to allow for movement in the axial direction relative to the driven shaft 46.

Figure 3:
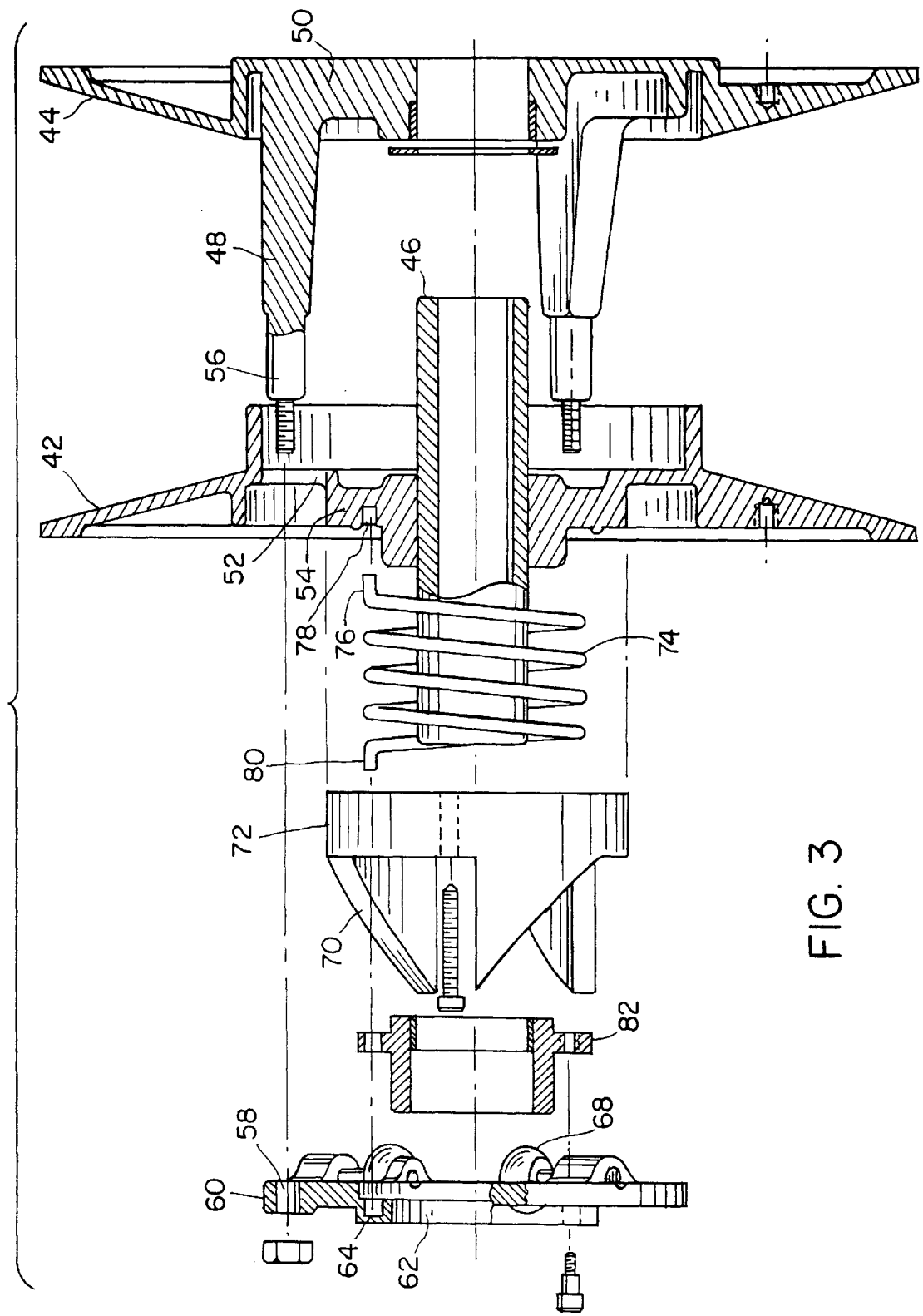
FIG. 3 is an exploded view showing the parts of the driven clutch.

The moveable pulley half has a plurality of posts 48 that are secured to a hub portion 50 and extend through arcuate openings 52 in the hub portion 54 of the fixed pulley half 42 as seen in FIGS. 2 and 3. Each of the posts 48 has a rod portion 56 adapted to be received by a hole 58 in a follower plate 60.

The follower plate 60, which is spaced from the movable pulley half 44 by the posts 48, has a central opening 62 with a raised shoulder portion 64. Surrounding the central opening 62, the follower plate 60 has the plurality of holes 58 to receive the rod portions 56 of the post 48, and a plurality of slots 66 with a roller device 68 located in proximity to one end of each of the slots 66, as best seen in FIG. 2.

Referring to FIGS. 2 and 3, the roller device 68 of the follower portion 60 works in conjunction with a cam track 70 of a cylindrical helix ring 72. The cylindrical helix ring 72 is secured to the hub portion 54 of the fixed pulley half 42.

Encircling the shaft 46 and generally located within the cylindrical helix ring 72 is a torsional spring 74. The spring 74 has a first leg 76 at one end that is received by a hole 78 in the hub portion 54 of the fixed pulley half 42 and a second leg 80 at the other end which is received by an adjustor ring 82.

Figure 4:
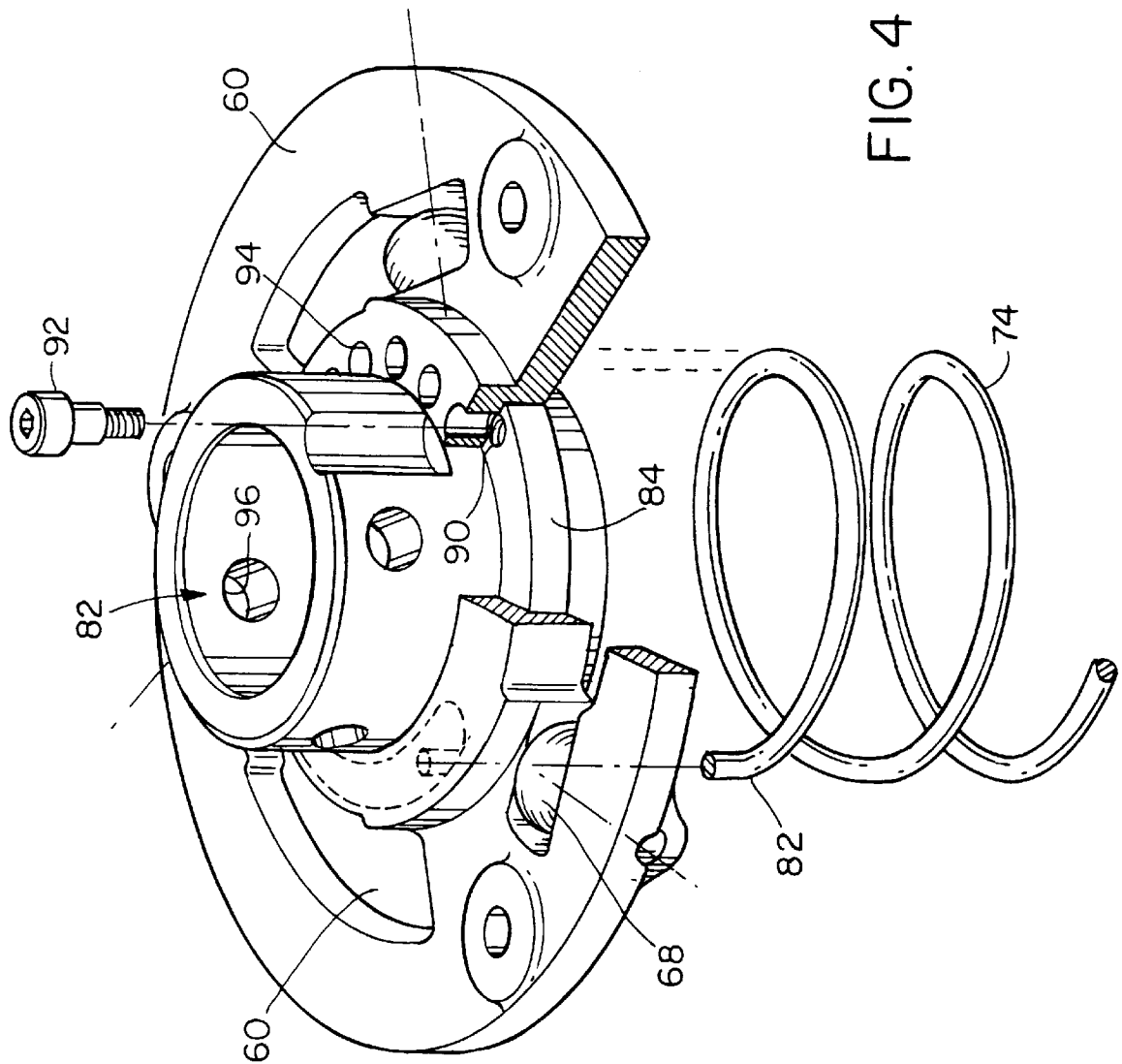
FIG. 4 is a perspective view of a spring, a follower plate and an adjustor ring of the driven clutch according to the invention.

Referring to FIGS. 3 and 4, the adjustor ring 82 is a cylindrical ring received by the follower plate 60. The adjustor ring has an annular ring 84 encircling the cylindrical ring. The annular ring 84 is received by a groove 86 located in the shoulder 64 of the follower plate as best seen in FIG. 4. The annular ring 84 has a hole 88 for receiving the second leg 80 of the spring 74. A slot, shown in hidden line in FIG. 4, in the follower plate 60 can receive a portion of the second leg 80 without interference if necessary. Located on the other side of the annular ring 84, and generally 180° around the adjustor ring 82, is an adjusting hole 90 which receives a holding element, such as a set screw 92. The set screw 92 extends through one of a plurality of adjustor holes 94 located in the follower plate 60. The adjustor ring 82 has at least one set of torquing holes 96 on one end of the cylindrical ring portion.

Figure 5:
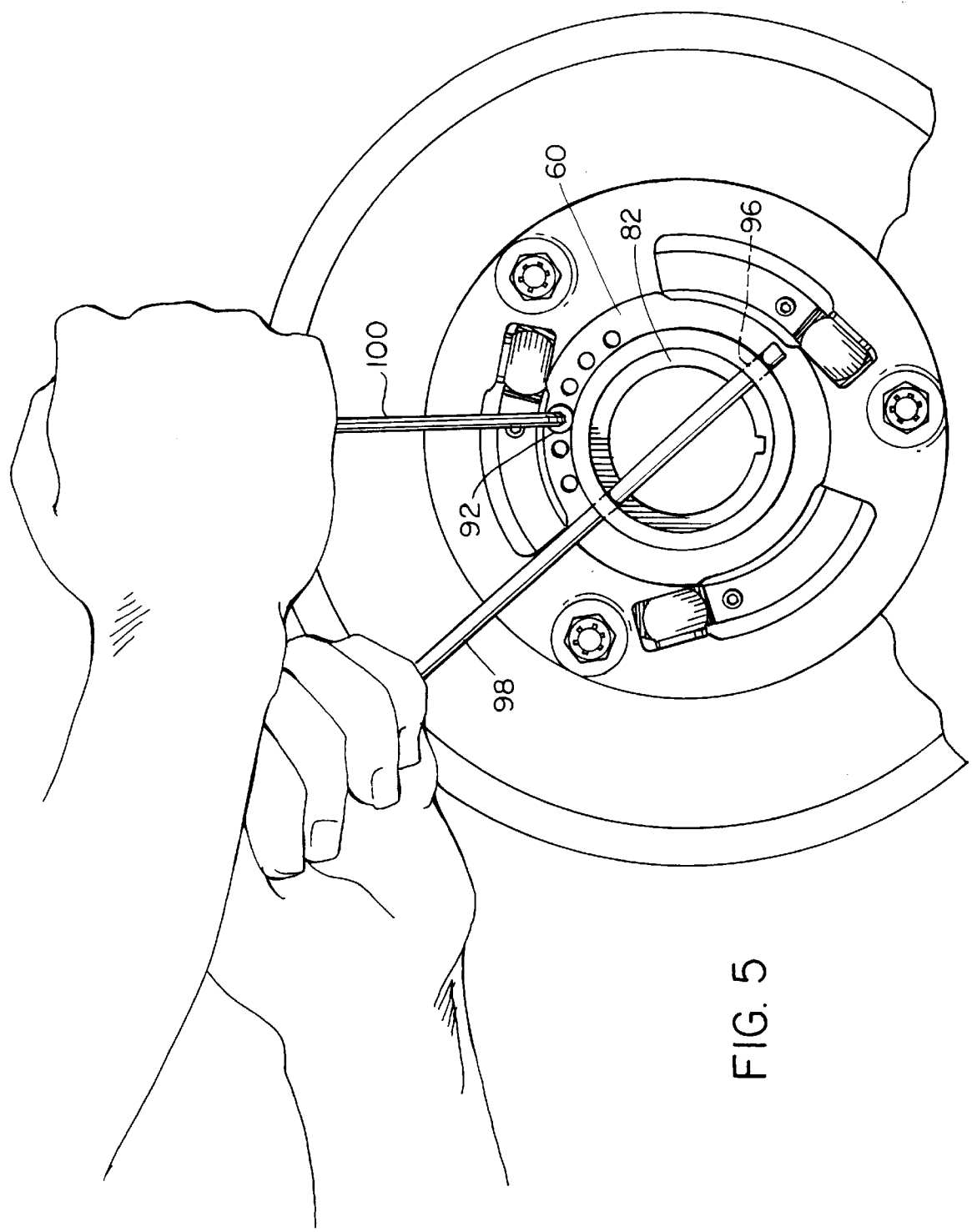
FIG. 5 is side view of the driven clutch being adjusted.

Referring to FIG. 5, with the engine of the snowmobile not running, the user inserts an adjusting rod tool 98 into one of the sets of torquing holes 96, shown in hidden line, in the adjustor ring 82. While holding the adjusting rod tool 98, the set screw 92 is loosened from the adjustor ring 82 with an allen wrench 100. The adjusting rod tool 98 is rotated either clockwise or counterclockwise to tighten or loosen the spring respectively. When the desired tightness is achieved, and the adjusting hole 90 of the adjustor ring 82 aligns with one of the adjustor holes 94 in the follower plate 60, the user installs the set screw 92 into the aligned adjustor holes 90 and 94. While it is preferred for safety considerations that the engine not be running, the adjustment can occur while the engine is running since the V-belt 22 and the driven clutch 10 are not rotating when the engine is idling.

By rotating the spring clockwise as shown in FIG. 4, the torsion of the spring 74 increases. Therefore, the variable transmission 16 will operate at a higher speed or RPM and higher torque conditions than that which would occur prior to the spring adjustment. This is the result of the spring making it more difficult for the pulley halves 42 and 44 to separate.

Figure 6:
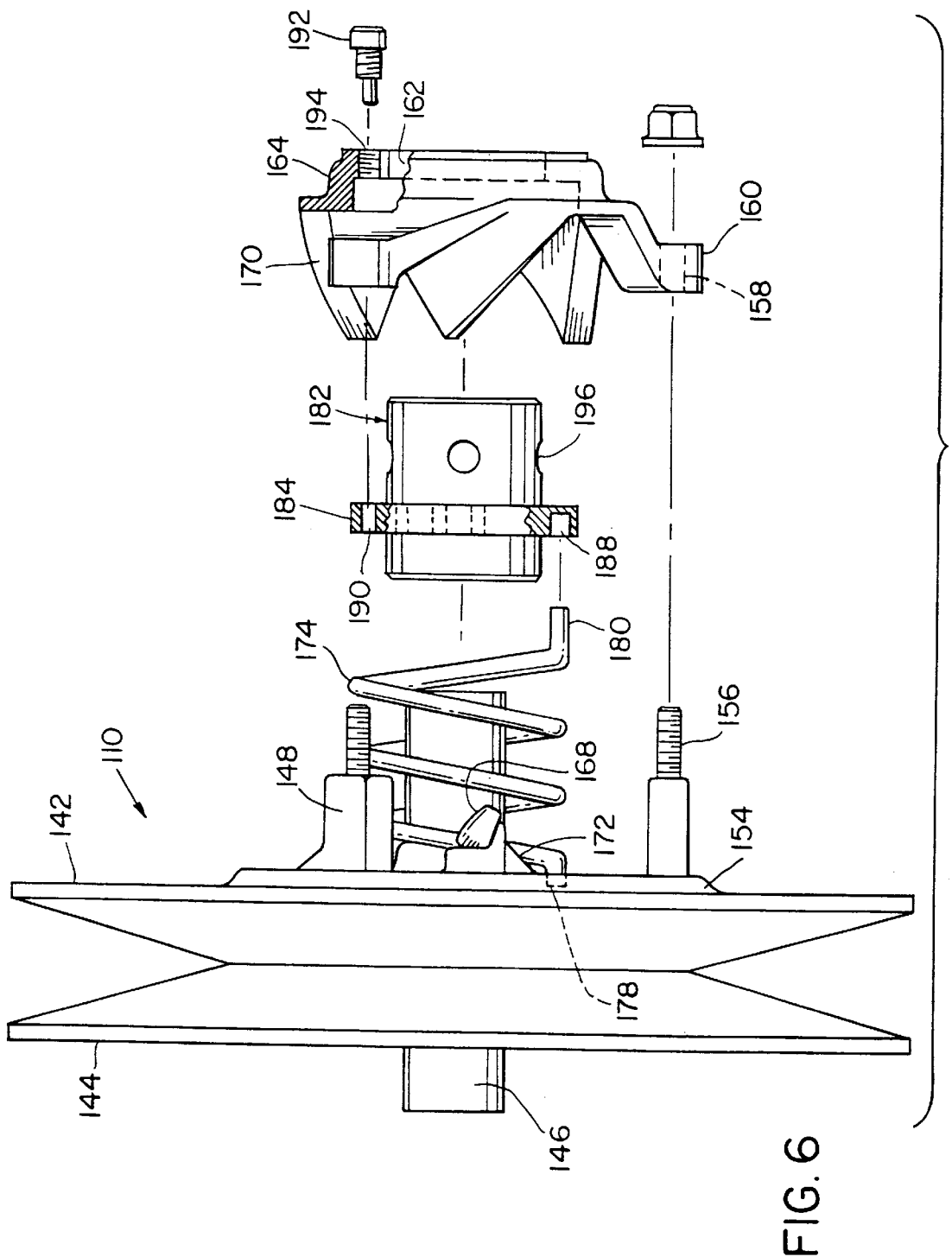
FIG. 6 is an exploded view showing the parts of an alternative driven clutch.
Figure 7:
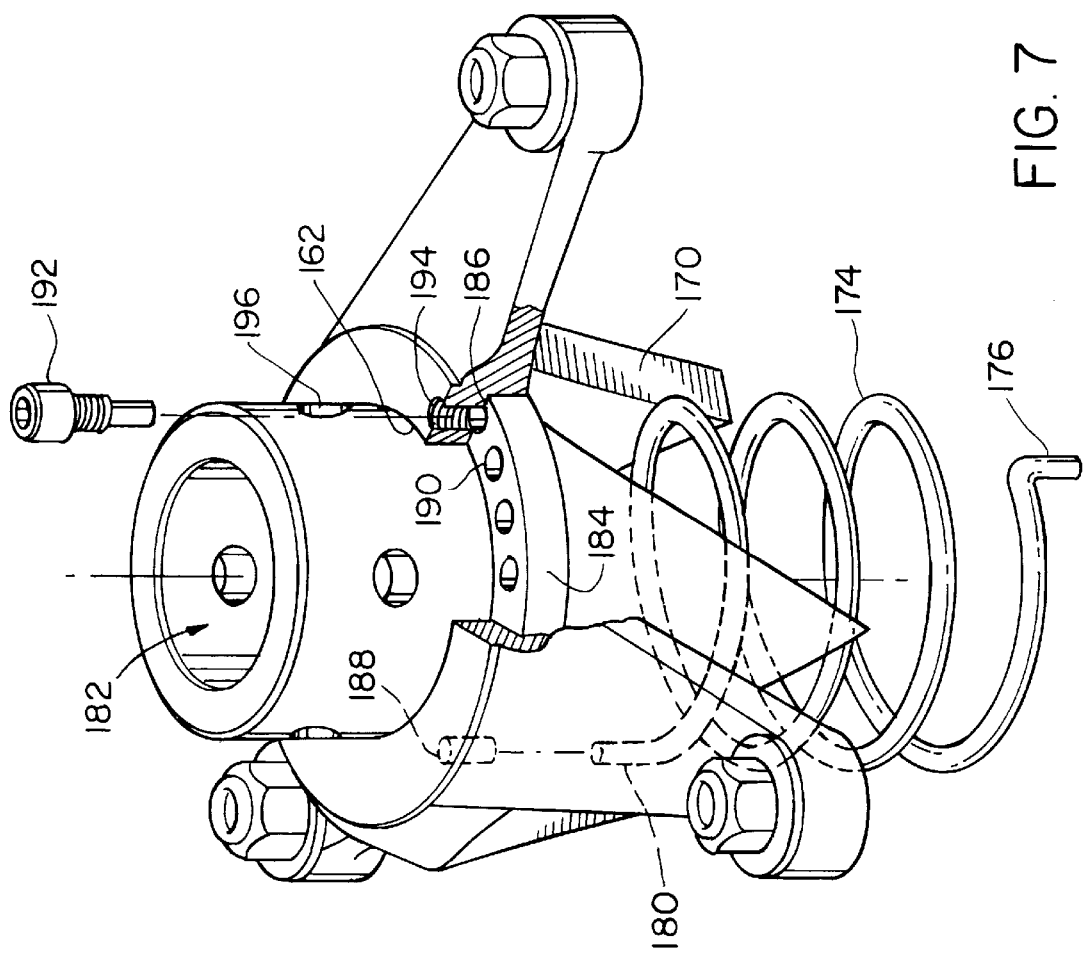
FIG. 7 is a perspective view of a spring, a follower plate and an adjustor ring of the driven clutch according to the invention.

An alternative embodiment of the invention is shown in FIGS. 6 and 7. The V-belt type continuously variable transmission has a driven clutch or pulley 110 having a fixed pulley half 142 and a movable pulley half 144. The fixed pulley half 142 is fastened to a driven shaft 146 and is not movable in the axial direction. The movable pulley half 144 has sleeve bearings between itself and the shaft 146 to allow for movement in the axially direction relative to the driven shaft 146.

The moveable pulley half has a plurality of posts 148 that are secured to a hub portion and extend through arcuate openings in the hub portion 154 of the fixed pulley half 142. Each of the posts 148 has a rod portion 156 adapted to be received by a hole 158 in a follower plate 160.

The follower plate 160, which is spaced from the movable pulley half 144 by the posts 148, has a central opening 162 with a raised shoulder portion 164. Surrounding the central opening 162, the follower plate 160 has the plurality of holes 158 to receive the rod portions 156 of the posts 148 and a plurality of cylindrical shaped cam tracks 170.

The helical cam tracks 170 of the follower portion 160 each work in conjunction with a slide 168 carried by a fixed ring 172. The fixed ring 172 is secured to the hub portion 154 of the fixed pulley half 142.

Encircling the shaft 146 and generally located within the fixed ring 172 is a torsional spring 174. The spring 174 has a first leg 176 at one end that is received by a hole 178, shown in hidden line in FIG. 6, in the hub portion of the fixed pulley half 142 and a second leg 180 at the other end which is received by an adjustor ring 182.

The adjustor ring 182 is a cylindrical ring received by the follower plate 160. The adjustor ring 182 has an annular ring 184 which is received by a groove 186 located in the shoulder 164 of the follower plate 160. The annular ring 184 has a hole 188 for receiving the second leg 182 of the spring 174. Located on the other side of the annular ring 184 and generally 180° around the adjustor ring 182 is a plurality of adjusting holes 190 which are each adapted to receive a retention mechanism, such as a set screw 192. The set screw 192 extends through an adjustor hole 194 located in the follower plate 160 and the aligned adjustor hole 190 in the adjustor ring 182. The adjustor ring 192 has at least one set of torquing holes 196 on the end of the cylindrical ring which extends through the central opening 162 in the follower plate 160.

Figure 8:
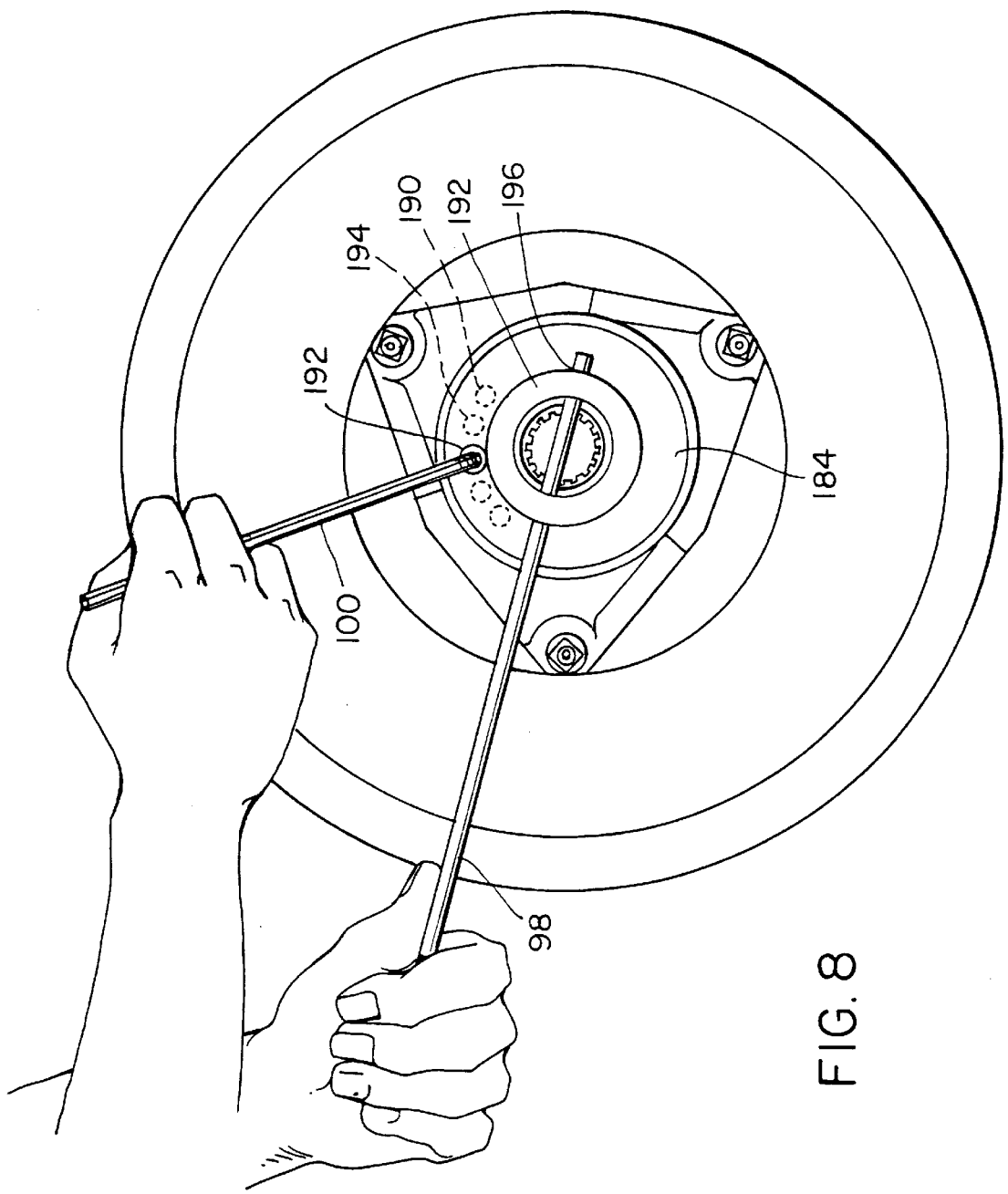
FIG. 8 is a side view of the driven clutch of FIG. 6 being adjusted.

Referring to FIG. 8, with the engine of the snowmobile running or not running, the user inserts an adjusting rod tool 98 into one of the sets of torquing holes 196 in the adjustor ring 192. While holding the adjusting rod tool 98, the set screw 192 is loosened from the adjustor ring 184 with an allen wrench 100. The adjusting rod tool 98 is rotated either clockwise or counterclockwise to tighten or loosen the spring respectively. When the desired tightness is achieved, the user installs the set screw 192 into the hole 194 in the follower plate 160 and the aligned adjustor hole 190 in the adjustor ring 182.

Figure 9:
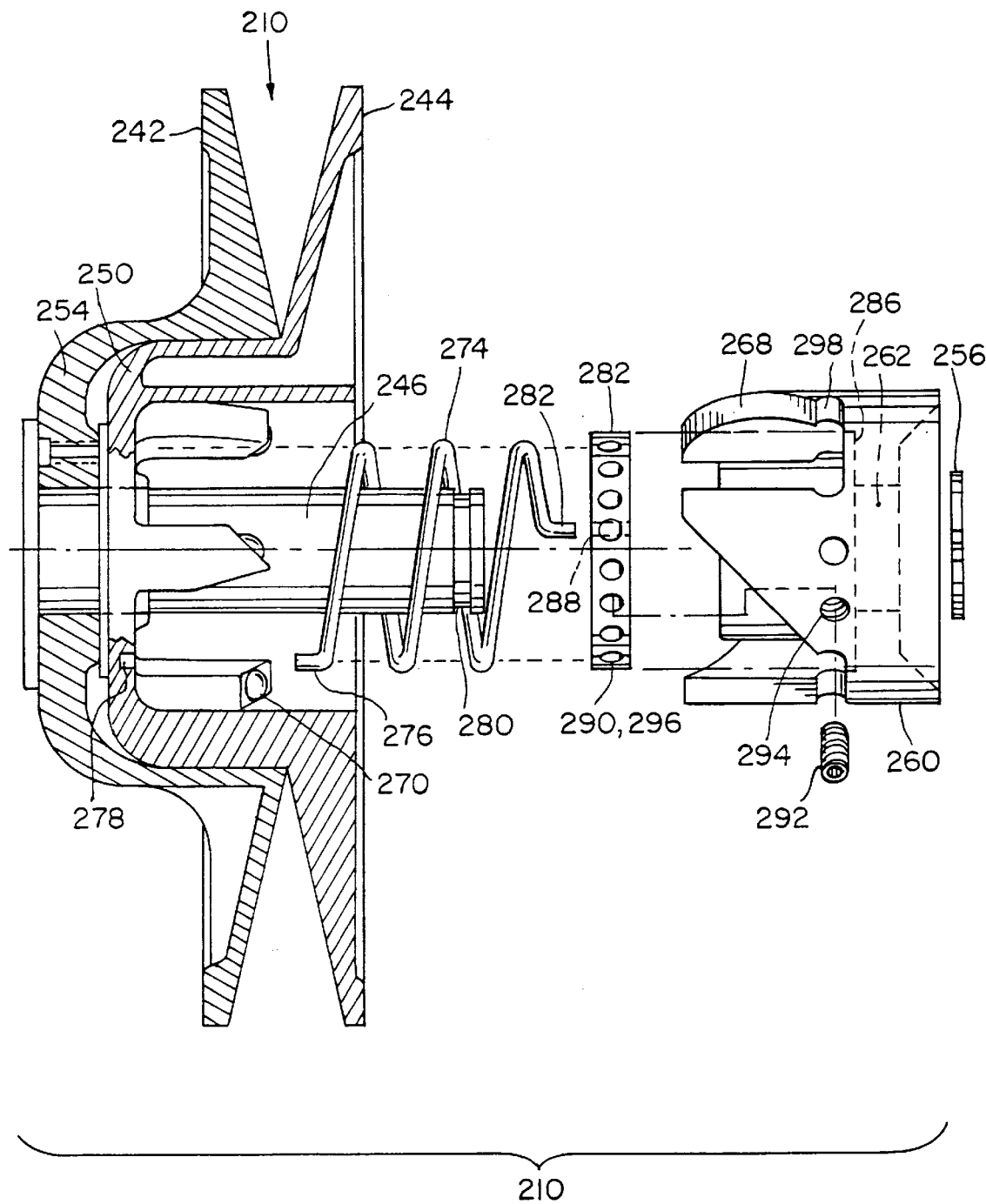
FIG. 9 is an exploded view showing the parts of another alternative drive clutch.
Figure 10:
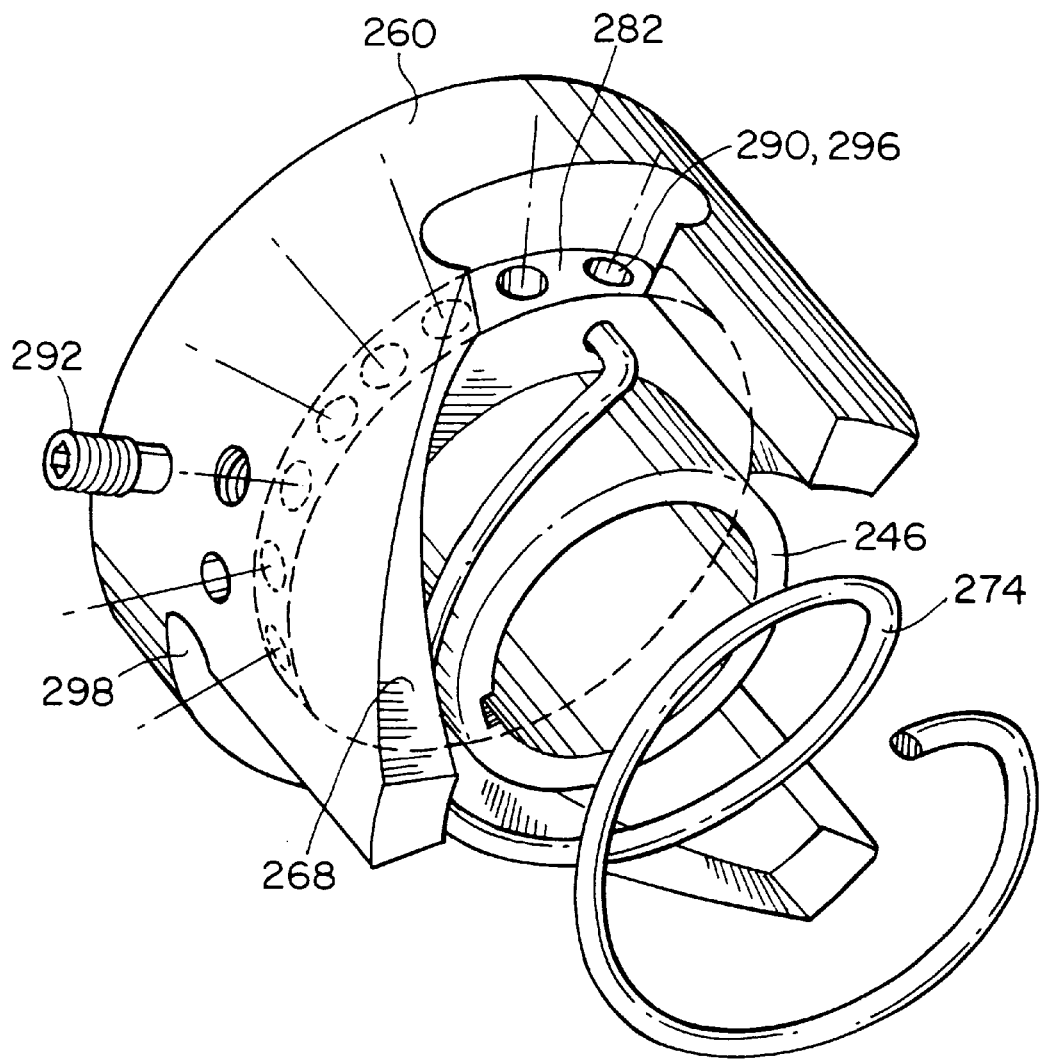
FIG. 10 is a perspective view of a spring, a follower plate and an adjustor ring of the driven clutch according to the invention.

A second alternative embodiment of the invention is shown in FIGS. 9 and 10. The driven pulley 210 has a fixed pulley half 242 and a movable pulley half 244. The fixed pulley half 242 is fastened to a driven shaft 246 and is not movable in the axial direction. The movable pulley half 244 has sleeve bearings between itself and the shaft 246 to allow for movement in the axial direction relative to the driven shaft 246. The movable pulley half 244 has a domed shaped center portion 250 that extends into a domed center 254 of the fixed pulley half 242.

The moveable pulley half 244 has a plurality of raised slide portions 270 located in the domed center portion 250 spaced around the sleeve bearing.

The driven shaft 246 has a slot 248 on the end that receives the moveable pulley half 144; the slot 248 receives a lock washer 256. The lock washer 256 limits the outward movement of a cylindrical follower plate 260 which has a central opening 262 for receiving the drive shaft 246. The follower plate 260 has a plurality of helical cam tracks 268 on its outer edge. The cam tracks 268 work in conjunction with the slides 270 carried by the domed area 250 of the moveable pulley half 244. The cam track 268 defines a central bore area 286 of the cylindrical follower plate 260. The central bore area 286 encircles the central opening 262 through which the driven shaft 246 extends.

Encircling the shaft 246 and generally located within the raised slide portions 270 of the movable pulley half 244 is a torsional spring 274. The spring 274 has a first leg 276 at one end that is received by a hole 278 in the domed center 250 portion of the movable pulley half 244 and a second leg 280 at the other end which is received by an adjustor ring 282.

The adjustor ring 282 is a cylindrical ring (annular ring 284) received by the bore area or groove 286 of the follower plate 260. The adjustor ring 282 has the hole 288 for receiving the second leg 280 of the spring 274. Located on the outer edge of the adjustor ring 282 is a plurality of adjusting holes 290 which are adapted to receive a set screw 292. The set screw 292 extends through an adjustor hole 294 located on the outside diameter of the follower plate 260. The adjustor ring uses the adjusting holes 290 as torquing holes 296. The follower plate 260 has a series of slots 298, a slot 298 cut between each cam track 268 to allow rotation of the adjustor ring 282 as explained below.

Figure 11:
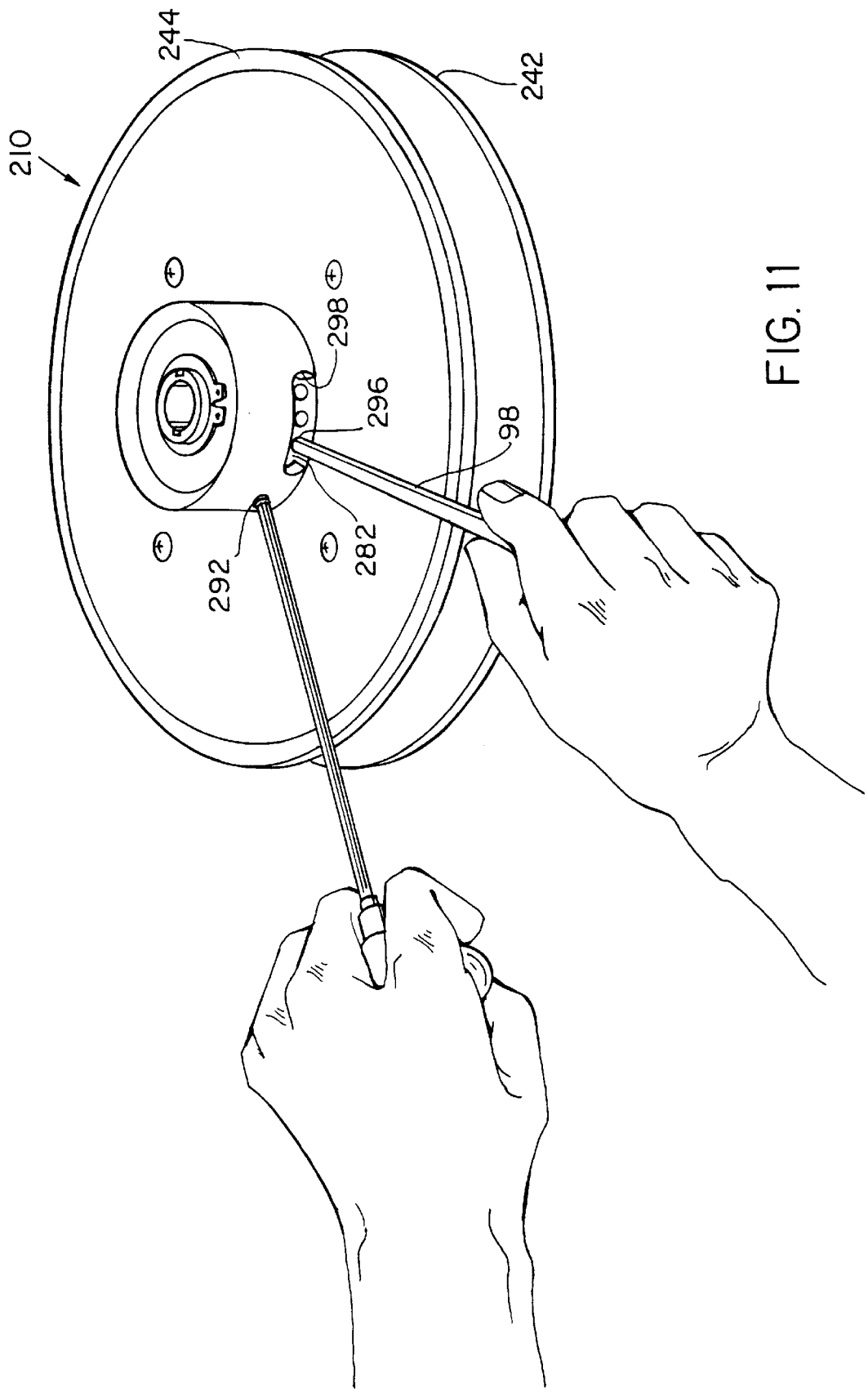
FIG. 11 is a side view of the driven clutch of FIG. 9 being adjusted.

Referring to FIG. 11, with the engine of the snowmobile running or not running, the user inserts an adjusting rod tool 98 into a single torquing hole 296 in the adjustor ring. While holding the adjusting rod tool 98, the set screw 292 is loosened from the adjustor ring 282 using the allen wrench 100. The torquing hole 296 is selected depending on whether the adjustor ring 282 is to be rotated clockwise or counterclockwise; the torquing hole 296 can be selected near one edge of one of the slots 298 so that the adjusting rod tool 98 can have maximum travel. The adjusting rod tool 98 is rotated either clockwise or counterclockwise to tighten or loosen the spring respectively. When the desired tightness is achieved, and one of the adjusting holes 290 of the adjustor ring 284 aligns with the adjustor hole 294 in the follower plate 260, the user installs the set screw 292 into the aligned adjustor holes 290 and 294.

It is recognized that a slot may be preferred to a plurality of adjustor holes in the follower plate in some embodiments. A gearing arrangement, such as a worm gearing, can be used to both rotate the adjustor ring relative to the follower plate and hold the ring and plate in relative position. While the adjustor device has been shown as an annular ring or cylinder, it is recognized that the adjustor device could have a series of sides such as an octagon or twenty sided adjustor. The multi-sided adjustor is moved out of a complementary shaped groove in a plate, such as a follower plate, and rotated to the desired position. The adjustor is moved back into the groove in the new position to adjust the spring torsion.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. An adjustment mechanism for a driven clutch of a variable transmission, the driven clutch having a fixed pulley half, a movable pulley half and a sprint, the adjustment mechanism comprising:

an adjustor ring adapted to receive a first end of a spring and to rotate relative to a second other end of the spring;

a follower plate adapted to be carried by one of the pulley halves, the plate receives the adjustor in rotatable relation;

one of the follower plates and the adjustor ring has an adjustor hole and the other has a plurality of adjustor holes adapted to receive a tool; and a set screw that extends through one of the plurality of adjustor holes that aligns with the adjustor hole in the other of the follower plate and the adjustor ring to retain the adjustor ring in a position relative to the follower plate.

2. A snowmobile driven clutch comprising:

a driven shaft;

a driven sheave having a fixed sheave half and a movable sheave half, the fixed sheave half secured to the driven shaft;

a plurality of slides carried by the moveable sheave half;

a follower plate spaced from the sheave halves and having plurality of ramps, and an annular bore surrounded by the plurality of ramps, the follower plate carried by the driven shaft and in fixed relation to the fixed sheave half;

the plurality of slides and the plurality of ramps for moving in engagement relative to each other as the sheave halves rotate relative to each other;

a coiled spring interposed between the follower plate and the sheave halves, the spring having a first leg received by one of the sheave halves, and a second leg;

an annular ring received by the annular bore of the follower plate and that rotates relative to the follower plate, the annular ring retains the second leg of the spring; and a set screw received by one of the plurality of holes in the annular ring aligned with an adjustor hole in the follower plate for retaining the adjustor ring in a set position relative to the follower plate and allowing movement of the adjustor ring relative to the follower plate in a second position.

3. A snowmobile driven clutch comprising:

a driven shaft;

a driven sheave having a fixed sheave half and a movable sheave half, the fixed sheave half secured to the driven shaft;

a pair of complementary surfaces for moving in engagement relative to each other as the sheave halves rotate relative to each other, one of the complementary surfaces carried by the fixed sheave half and the other carried by the movable sheave half;

a follower plate spaced from the sheave halves and having one of the complementary surfaces, and a groove, the follower plate carried by one of the sheave halves;

a coiled spring interposed between the follower plate and the sheave halves, the spring having a first leg received by one of the sheave halves, and a second leg;

an adjustor ring having a cylindrical ring with an annular ring received in the groove of the follower plate, and that rotates relative to the follower plate, the adjustor ring retains the second leg of the spring; and a set screw received by an adjustor hole in the annular ring of the adjustor ring aligned with an adjustor hole in the follower plate for retaining the adjustor ring in a set position relative to the follower plate and allowing movement of the adjustor ring relative to the follower plate in a second position.

4. The snowmobile driven clutch of claim 3 wherein one of the pair of complementary surfaces is carried by the fixed sheave half and the other of the pair of complementary surfaces is carried by the follower plate which is carried by the movable sheave half by a plurality of posts.

5. A snowmobile driven clutch of claim 4 wherein the complementary surface carried by the fixed sheave half is a plurality of cam tracks on a cylindrical ring and the complementary surface carried by the follower plate is a plurality of roller devices, the follower plate has a plurality of adjustor holes for selective alignment with the adjustor hole of the adjustor ring.

6. The snowmobile driven clutch of claim 4 wherein the complementary surface carried by the fixed sheave half is a plurality of slides on a cylindrical ring and the complementary surface carried by the follower plate is a plurality of cam tracks, the adjustor ring has a plurality of adjustor holes for selective alignment with the adjustor hole of the follower plate.

7. In combination a driven clutch of a variable transmission and an adjustment mechanism, comprising:

the driven clutch having a fixed pulley half, a movable pulley half, and a spring the adjustment mechanism comprises:

an adjustor ring that receive a first end of a spring and to rotate relative to a second other end of the spring which is carried by one of the pulley halves;

a follower plate carried by one of the pulley halves, the plate receives the adjustor in rotatable relation;

one of the follower plates and the adjustor ring has an adjustor hole and the other has a plurality of adjustor holes adapted to receive a tool; and a set screw that extends through one of the plurality of adjustor holes that aligns with the adjustor hole in the other of the follower plate and the adjustor ring to retain the adjustor ring in a position relative to the follower plate.

* * * * *